(12) United States Patent
De Ruffray et al.

(10) Patent No.: US 8,336,819 B2
(45) Date of Patent: Dec. 25, 2012

(54) LANDING GEAR CASING PROVIDED WITH A DISSOCIATED STRUCTURE

(75) Inventors: Paul De Ruffray, Toulouse (FR); Rodolphe Morel, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 851 days.

(21) Appl. No.: 12/094,378

(22) PCT Filed: Nov. 14, 2006

(86) PCT No.: PCT/EP2006/068462
§ 371 (c)(1),
(2), (4) Date: Oct. 29, 2008

(87) PCT Pub. No.: WO2007/057400
PCT Pub. Date: May 24, 2007

(65) Prior Publication Data
US 2010/0032521 A1  Feb. 11, 2010

(30) Foreign Application Priority Data

Nov. 21, 2005 (FR) ....................................... 05 53535
Nov. 14, 2006 (WO) .................. PCT/EP2006/068462

(51) Int. Cl.
B64C 25/00 (2006.01)
(52) U.S. Cl. .............. 244/102 R; 244/102 A; 244/100 R
(58) Field of Classification Search ................... 244/119, 244/117 R, 102 R, 102 A, 100 R, 103 R
See application file for complete search history.

(56) References Cited

U.S. PATENT DOCUMENTS

| 2,826,381 | A * | 3/1958 | Cruz ........................ 244/102 SL |
| 2,982,500 | A * | 5/1961 | Lucien ....................... 244/102 R |
| 4,228,975 | A * | 10/1980 | Sealey ...................... 244/102 R |
| 4,579,301 | A * | 4/1986 | Brand ............................ 244/119 |
| 5,897,078 | A * | 4/1999 | Burnham et al. .......... 244/117 R |
| 6,213,428 | B1 * | 4/2001 | Chaumel et al. ............... 244/119 |
| 6,766,984 | B1 * | 7/2004 | Ochoa ........................... 244/119 |
| 6,824,100 | B1 * | 11/2004 | Cheetham ................. 244/102 R |
| 2004/0217235 | A1 * | 11/2004 | Wilding et al. ............... 244/119 |

* cited by examiner

*Primary Examiner* — Tien Dinh
*Assistant Examiner* — Justin Benedik
(74) *Attorney, Agent, or Firm* — Perman & Green, LLP

(57) ABSTRACT

A reduced-volume casing for a landing gear including a chassis for fixing and taking up loads, to which the landing gear is exposed and an envelope-type structure arranged on the chassis for taking up pressurization forces. The chassis can include, in particular, a frame which is even to the output opening of the landing gear and is provided with beams used for receiving means for maintaining the fastening bearings of the gear and also including polygons which are used for receiving the fastening bearings of the gear manoeuvring strut and are fixed to the beams, wherein the beams and polygons form a lattice structure.

14 Claims, 4 Drawing Sheets

Figure 1:
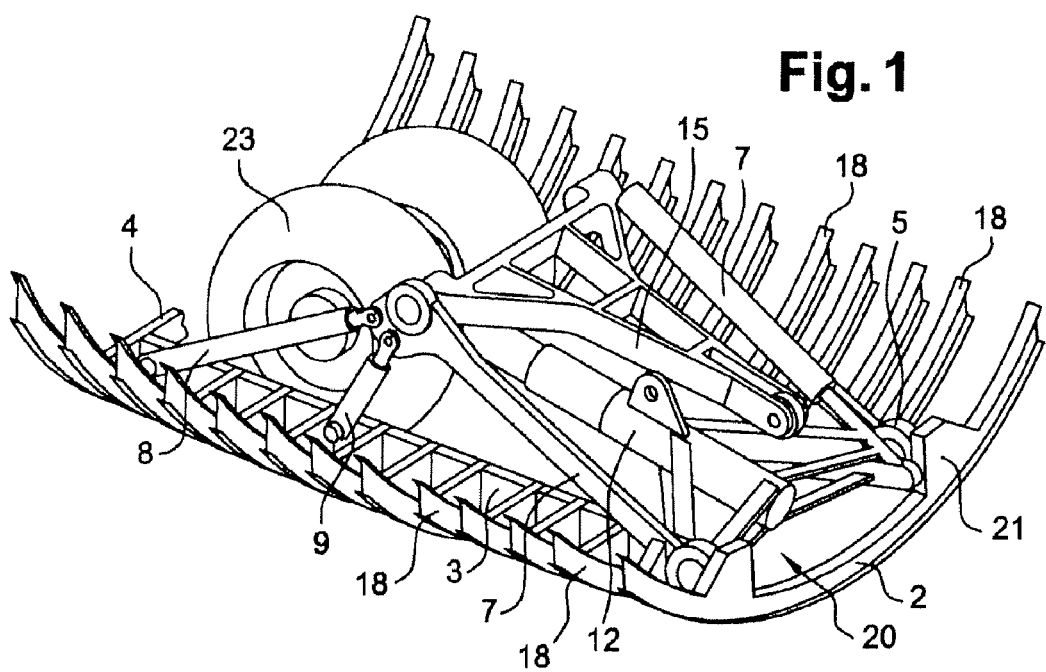

Fig. 5
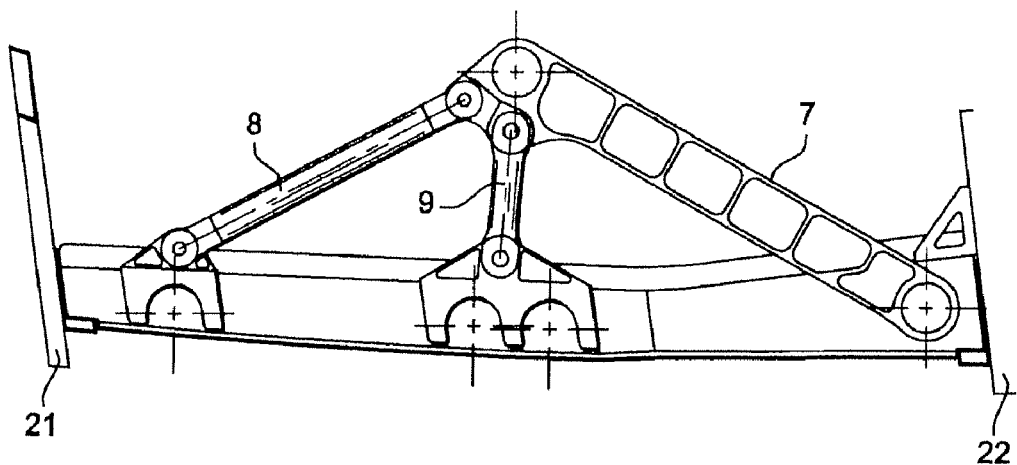
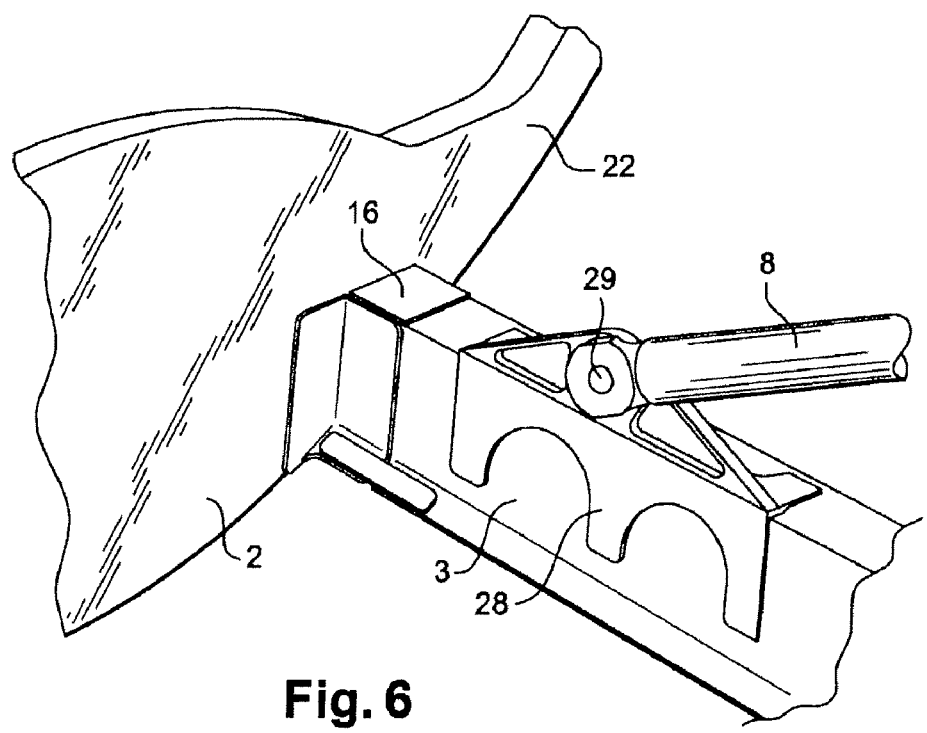
Fig. 6

LANDING GEAR CASING PROVIDED WITH A DISSOCIATED STRUCTURE

CROSS REFERENCE TO RELATED APPLICATIONS

This application is the National Stage of International Application No. PCT/EP2006/068462 International Filing Date, 14 Nov. 2006, which designated the United States of America, and which International Application was published under PCT Article 21 (2) as WO Publication No. WO2007/057400 and which claims priority from French Application No. 0553535, filed on 21 Nov. 2005, the disclosures of which are incorporated herein by reference in their entireties.

BACKGROUND

1. Field

The disclosed embodiments relate to a landing gear casing of an aircraft for which the structure is dissociated between a structural part and a protection part of the internal space of the aircraft.

2. Brief Description of Related Developments

The purpose of landing gear casings of an aircraft is to receive the landing gears and to separate the internal space of the aircraft that is often pressurized from the outside of the aircraft.

Due to the stresses that they suffer, ground stresses transmitted by the landing gearing during landing, compression stresses due to internal pressurization, and by the fact that they must receive the landing gear in the retracted position, the landing gear casings of the prior state of the art include reinforcement frames in the form of arches, that extend from the frame elements of the fuselage, distributed longitudinally along the casing and surrounding the landing gear casing. The reinforcement frames stiffen the panels of the landing gear casing so as to form stiffened flat panels.

These panels of the prior state of the art receive the landing gear bearings and ensure the imperviousness of the landing gear casing area. This construction makes landing gear casings voluminous and massive.

SUMMARY

The purpose of the disclosed embodiments is to build a reduced volume landing gear casing, optimized to comply with two types of stresses, ground and pressurization stresses, and to do so propose a reduced volume landing gear casing for the aircraft landing gear that includes a chassis to ensure the securing and the take up or absorption of the landing gear stresses and an envelope structure attached to the chassis to take up or absorb the pressurization stresses.

More in particular, the chassis includes a frame that is flush with an opening through which extends the landing gear and comprising beams that receive means for maintaining the bearings onto which the landing gear is attached.

According to a particular mode of embodiment, the chassis also includes polygons, for receiving the bearings for attaching a strut for manoeuvring the landing gear, secured onto the beams, with the beams and the polygons forming a lattice structure.

The solution of the disclosed embodiments based on a dissociation of the structure that takes up or absorbs the ground stresses and the structure that absorbs the pressurization stresses thus permits to better adapt these structures to the types of stresses that they must withstand and thus to reduce the mass and volume of the landing gear casing.

Figure 7:
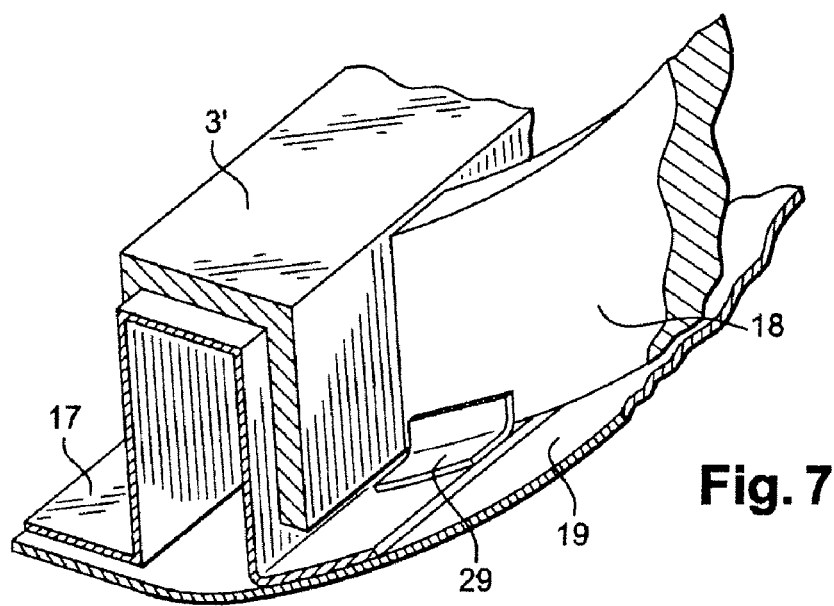
Figure 2A:
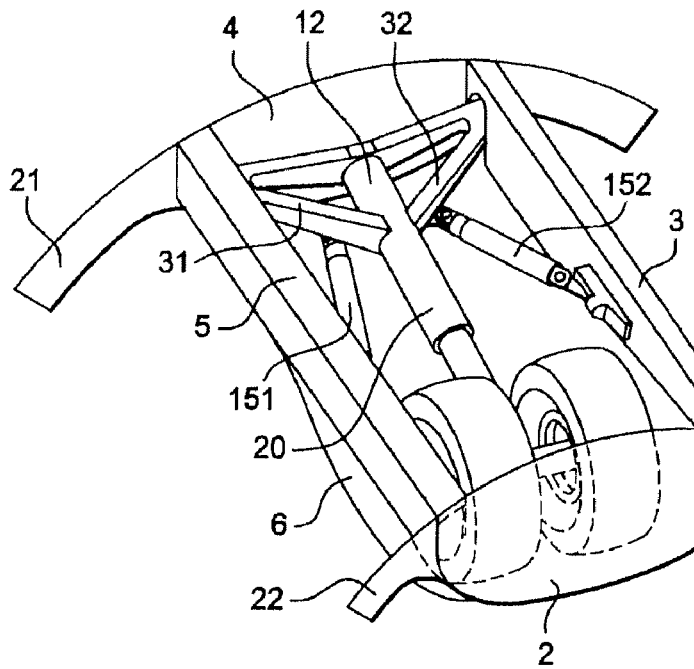
Figure 2B:
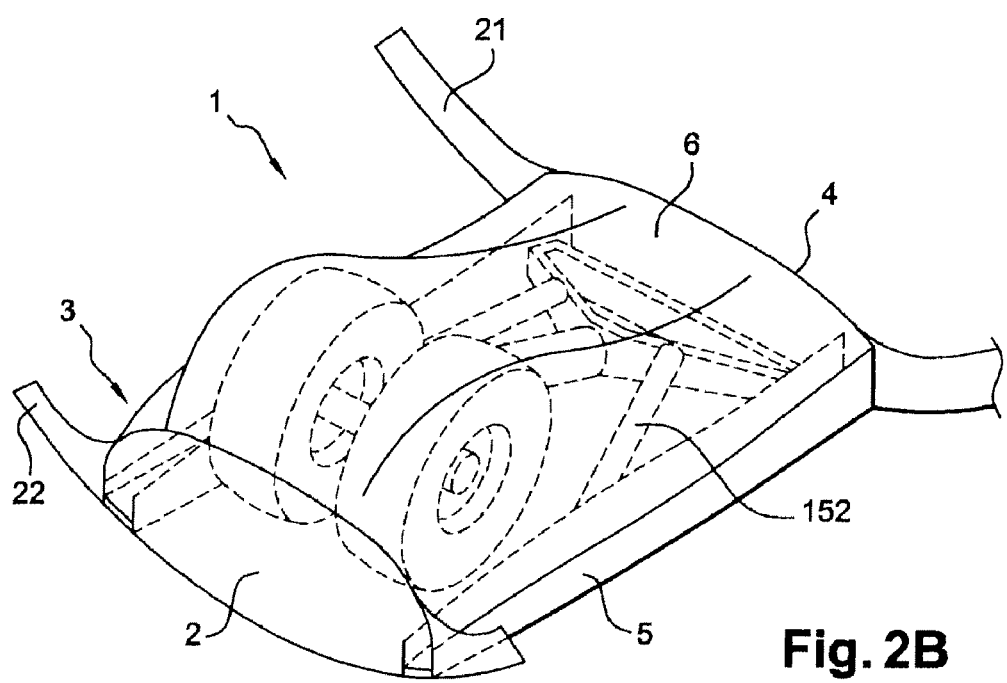
Figure 3:
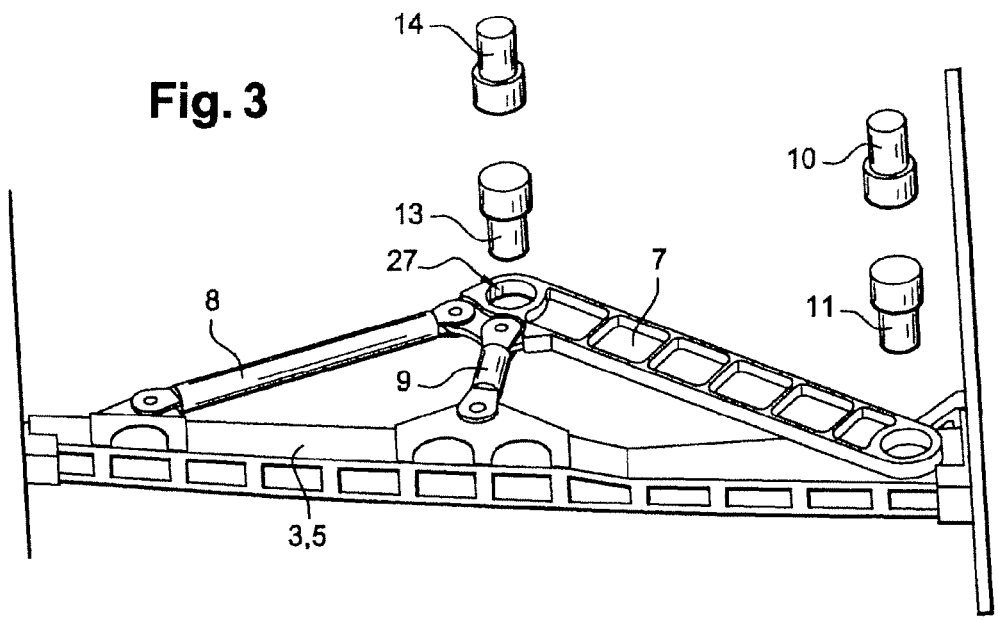
Figure 4:
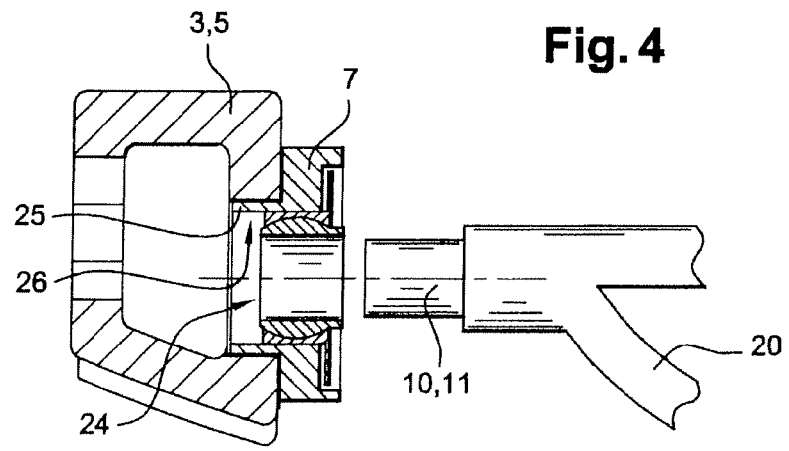

Other characteristics and advantages of the disclosed embodiments are better understood when reading the description that will follow of non-limiting examples of embodiment when referenced to the figures and illustrations that show:

BRIEF DESCRIPTION OF THE DRAWINGS in FIG. 1: a view in perspective of a part of the fuselage structure comprising a landing gear casing according to the disclosed embodiments;

in FIGS. 2A and 2B: views in perspective respectively of the top and bottom of a landing gear casing according to a variant of the disclosed embodiments;

in FIG. 3: a view in perspective of a beam of the landing gear casing of figure 1;

in FIG. 4: a detail of the attachment of a bearing of the landing gear of figure 1;

in FIG. 5: a side view of the beam of FIG. 3;

in FIG. 6: a detailed view in perspective of the attachment of the beam of FIG. 1;

in FIG. 7: a cross-section view in perspective of an example of embodiment of the beam of the landing gear casing according to a particular mode of embodiment.

DETAILED DESCRIPTION OF THE DRAWINGS

On FIG. 1, a landing gear 20 has been shown in the retracted position in the fuselage of an aircraft. The landing gear is a front landing gear that includes wheels 23, a leg 12 and a strut 15.

The fuselage, for which the skin is not shownhere for reasons of clarity, is performed from a plurality of fuselage frames 18, 20, 21.

At the landing gear casing, frames 18 of the fuselage structure are open to permit the layout of the landing gear and the door elements.

The disclosed embodiments propose to simplify the embodiment of the landing gear casing by not extending the frames 18 by means of arches located on the contour of the landing gear casing but to perform the landing gear casing from a chassis, to ensure the securing and the absorption of the stresses of the landing gear, and to attached onto the chassis an envelope structure 6 to take up or absorb the pressurization stresses.

The chassis, in particular represented on FIGS. 2A and 2B includes a frame 2, 3, 4, 5 that is flush with an opening through which the landing gear extends itself.

The frame includes beams 3, 5 on FIG. 2A, parallel to the longitudinal centerline of the aircraft and located on either side of the landing gear housing 20.

The frame also includes front and back cross-beams 2, 4 that, as will be seen later, are beneficially bottom elements of frames 21, 22 of the fuselage ending the landing gear casing in the front and the back of the latter.

The beams receive means for maintaining the bearing 10, 11 for attaching the landing gear that, in the case of the example of FIG. 1 and of FIGS. 3 to 6, are arms 7 of polygons 7, 8, 9 for receiving the bearings 13, 13 that attach a strut 15 for manoeuvring the landing gear.

Indeed, according to the example of the embodiment, the gear is a landing gear with an articulated strut 15 situated along the longitudinal centerline of the landing gear.

This landing gear comprises a T that extends the leg 12 upward, with the ends of the top branch of the T forming bearings 10,11 for rotating the leg 12 for retracting the landing gear.

The strut is articulated on leg 12 and comprises itself bearings 13, 14 that must be attached inside the casing of the landing gear.

According to the mode of embodiment polygons 7, 8, 9 are triangles attached to the beams, with beams 3, 5 and polygons 7, 8, 9 forming a rigid lattice type structure.

The polygons are made up of arms 7 to attach the strut 15 and at least one rod 8, 9 for holding the arm. According to the example shown, two rods are provided to unite arm 7 to beam 3, 4 so as to distribute the traction efforts exerted by the strut on the beam through the arm.

Bearings 13, 14 for attaching the strut 15 are received in a housing at the end of the arms, at the tops of the polygons separated from the beams.

As such, the bearings of the landing gear and the bearings of the strut are received respectively at a first end and a second end of arms 7; with arms 7 ensuring the take up or absorption of the efforts/stresses at all bearings.

As shown on FIG. 4, bearings 10, 11 of the landing gear are received in a housing 24 at the end of arm 7 with this end being made up of an end plate 25 received in a housing 26 of beam 3, 5.

The end of the arm thus forms an insert received in beam 3, 5.

Bearings 13, 14 that secure the strut are received directly in a housing 27 at the opposite end of the arm 7, an end on which also rods 8, 9 are secured.

As such, arms 7 that receive the bearings of the landing gear as well as the bearings of the strut ensure the rigidity of the mobile equipment made up of the landing year with its strut.

For their part, beams 3, 5, take up or absorb the stresses of the complete landing gear.

The example of FIGS. 2A and 2B applies to an embodiment variant of the landing gear that comprises two diagonal struts.

The diagonal struts are front telescopic struts 151, 152 connected to reinforcement bars 31, 32 of the landing gear and are each provided with a bearing 13, 14; the bearings of these diagonal struts are like the bearings of the landing gear received in the lateral boxes (caissons) 3, 5.

According to this mode of embodiment, the bearings of the landing gear and the first ends of the diagonal struts are connected directly onto beams 3, 5.

According to the embodiment examples, the chassis comprises end cross beams 2, 4 made up of the bottom segments of the frames of the fuselage structure forming the front wall and the rear wall of the landing gear casing 1. As such, the beams are directly connected to these frames which increases the rigidity of the landing gear casing without requiring the addition of intermediate arches linking the beams.

In a particular mode of embodiment shown on FIG. 6, beams 3, 3', 5 are connected to said frames 21, 22 by angle irons 16 that permit rigidly securing the beams.

This FIG. 6 also permits to better distinguish how to secure the rods 8 onto the beams by means of fittings 28 on which are connected the bolts 29 for securing the rods 8, 9.

According to the mode of embodiment of FIG. 4, beams 3, 5 are in C shape but it is also possible to produce the beams with a U iron turned in such a way that they receive in their hollow portion, angle irons 17 for connecting the components of open frames 18 of the fuselage structure, situated along the longitudinal sides of the landing gear casing and that are supported on beams 3, 5.

FIG. 7 represents a detail of such an embodiment for which beam 3', seen as a cross section in perspective, receives angle iron 17 on which is positioned skin 19 of the fuselage and open frame 18 is secured.

Frame 18 of the fuselage is joined to the corner iron by a square angle iron 29.

The landing gear casing according to the disclosed embodiments also includes an envelope structure 6 that has as function isolating the inside of the aircraft from the outside, and to withstand the pressurization stresses or forces.

To optimize the resistance of the landing gear casing to the pressurization forces, on the one hand, the envelope structure comprises a contour that joins frame 2, 3, 4, 5 of the chassis inside the aircraft so that the envelope rests on the frame and on the other hand, the envelope structure 6 is a longitudinally and transversally curved surface structure for which the curvature is adapted to balance the pressurization efforts that are applied onto it.

Such a structure is better adapted to the take up or absorption of such efforts than the flat panel structure of the prior state of the art.

In addition, according to the disclosed embodiments, a much greater freedom of embodiment is given to the envelope structure 6 that no longer applies to stiffening arches but of which the bottom contour rests on the frame of the chassis and joins the top contour.

The envelope can as such be a structure with a curved longitudinal profile that forms a fairing or shroud with an adapted shape, to join the profile of the retracted landing gear 20, and that can be performed as close as possible to the elements that extend towards the inside of the aircraft to limit the internal dimensions of the landing gear casing and to free up space for the equipment located in the nose of the aircraft when the landing gear in question is the front landing gear.

The envelope structure can among other be made of a molded composite material in a form that corresponds to the dimensions of the landing gear and calculated also to offer a good resistance to the pressure stresses, with the resulting shape being beneficially a semi-egg-shaped without edges or breaks or folds.

The disclosed embodiments that permits the embodiment of a rigid landing gear casing with a limited volume and mass, is not limited to the examples shown and among other, the chassis structure and the envelope structure can be used for landing gears other than the front landing gear of an aircraft.

The invention claimed is:

1. A reduced volume landing gear casing for aircraft landing gear, said casing comprising:
    a chassis to ensure the securing and take up or absorption of landing gear stresses comprising a frame flush with an opening through which the landing gear extends, the frame comprising parallel beams flush with the opening and to which the landing gear is attached; and
    an envelope structure joined at least to the parallel beams, to take up or absorb pressurization stresses.

2. A landing gear casing according to claim 1, comprising bearings received by the parallel beams for attaching the landing gear to the parallel beams.

3. A landing gear casing according to claim 2, wherein the chassis includes polygons for receiving bearings of a strut for manoeuvring the landing gear, said polygons secured to the parallel beams, wherein the parallel beams and the polygons form a lattice structure.

4. A landing gear casing according to claim 3 wherein the polygons comprise an arm attached to the strut and at least one rod holding the arm, said arm and said rod attached to the parallel beams, wherein a bearing securing the strut is received at tops of the polygons separated from the parallel beams.

5. A landing gear casing according to claim 2 wherein the envelope structure includes a contour that joins the frame on an inside of an aircraft comprising the landing gear casing.

6. A landing gear casing according to claim 2 wherein the chassis includes end cross beams that form a front wall and a rear wall of the landing gear casing.

7. A landing gear casing according to claim 6 wherein the parallel beams are connected to said front and rear walls by square angle irons.

8. A landing gear casing according to claim 2 wherein the parallel beams comprise a U iron that receives in its hollow section a corner iron for connecting parts of open frames of a fuselage structure situated along longitudinal sides of the landing gear casing.

9. A landing gear casing according to claim 1 wherein the envelope structure comprises a curved longitudinal profile forming a fairing or shroud with an adapted shape to join an envelope of a profile of the retracted landing gear.

10. A landing gear casing according to claim 9 wherein the envelope structure comprises a longitudinal and transversal curved surface for which the curvature is adapted to balance pressurization stresses that are applied onto the envelope structure.

11. An aircraft equipped with a landing gear casing according to claim 1.

12. An aircraft equipped with a landing gear casing according to claim 1 wherein the envelope structure includes a contour that is flush with the frame of the chassis on an inside of the aircraft.

13. An aircraft according to claim 12 wherein the envelope structure is a structure with a curved longitudinal profile forming a fairing or shroud with an adapted shape to be flush with an envelope of a profile of the landing gear when retracted.

14. An aircraft according to claim 12 wherein the envelope structure is a structure with a longitudinal and transversal curved surface for which the curvature is adapted to balance pressurization stresses that are applied onto the envelope structure.

* * * * *